United States Patent Office 2,993,940
Patented July 25, 1961

2,993,940
PRODUCTION OF CONJUGATED DIOLEFINS
Wilfred John Oldham, Grangemouth, Scotland, assignor to British Hydrocarbon Chemicals Limited, London, England, a British company
No Drawing. Filed June 18, 1958, Ser. No. 742,711
Claims priority, application Great Britain July 10, 1957
7 Claims. (Cl. 260—681)

The present invention relates to the production of conjugated diolefines by the reaction of aldehydes with lower mono-olefines.

The condensation of olefines with aldehydes is sometimes called the Prins reaction. Such condensation reactions are capable of yielding a variety of products such as m-dioxanes, unsaturated alcohols, 1:3-diols or conjugated diolefines depending on the reaction conditions employed. The production of conjugated diolefines by the reaction between mono-olefines and aldehydes has been carried out by means of a two-stage process and by a one-stage vapour phase process. A variety of catalysts has been proposed for the one-stage reaction of which the best has appeared to be activated alumina. However, the yields of diolefine and efficiency of conversion of the starting materials have been low, owing apparently to the tendency of the diolefine to react with the aldehyde, forming higher boiling condensation products, and also because of the decomposition of formaldehyde to give such products as carbon monoxide. As a result the process has not represented an economic proposition on the industrial scale.

It is an object of the present invention to provide an improved process for the production of conjugated diolefines by the condensation of aldehydes and lower mono-olefines in a single stage reaction, in which improved yields and efficiencies are obtained.

According to the present invention, the process for the production of conjugated diolefines comprises reacting a lower mono-olefine with formaldehyde or acetaldehyde at an elevated temperature in the vapour phase in the presence of an acidic surface-active clay catalyst.

The solid catalysts which may be used in the process of the present invention are the acidic surface-active clay catalysts known as montmorillonites, bentonites, fuller's earths, vermiculites, attapulgites, kaolinites and illites in their acid-activated form. As examples of such acid-activated clays available commercially, may be mentioned the fuller's earths marketed by the Fullers' Earth Union Ltd., Redhill, Currey, the Attapulgus clays, marketed by the Attapulgus Clay Company, U.S.A., and the Florex clays, marketed by the Floridin Co., U.S.A.

The olefines which are suitable for use in the process of the present invention are the lower mono-olefines having up to six carbon atoms, and particularly the tertiary olefines, i.e. olefines of the general formula $R_1R_2C=CHR_3$, where $R_1$ and $R_2$ are lower alkyl radicals, and $R_3$ is hydrogen or a lower alkyl radical. Olefines which isomerise under the reaction conditions to give tertiary olefines of the type $R_1R_2C=CHR_3$ may also be used. It is particularly preferred to use isobutene, 2-methylbutene-2, and 2-methylbutene-1. The molar proportion of olefine is preferably at least equal to that of the aldehyde used, and is suitably between 1 and 20 moles per mole of aldehyde.

The aldehydes which can be used in the process of the present invention are formaldehyde and acetaldehyde. The use of formaldehyde is preferred. The formaldehyde is suitably derived from industrial formalin, which is a solution of 36 to 40% by weight of formaldehyde in water, usually containing some methanol. Compounds giving rise to formaldehyde under the reaction conditions, e.g. trioxane and paraformaldehyde, may also be used.

It has also been discovered that the proportion of aldehyde in the reaction gas mixture is quite critical, and it is preferred to use proportions of aldehyde in the total feed of less than 10 mole percent, preferably between 2 and 10 mole percent. This may be achieved by the use of an inert diluent, for instance, nitrogen, hydrocarbons, such as the lower paraffins, carbon dioxide or steam.

The reaction may be carried out over a wide range of temperatures, for instance between 150° and 400° C. It is preferred to use temperatures in the range 250° to 350° C. The space velocity of the reactants over the catalyst may likewise vary and is suitably between 0.5 and 50 expressed as moles aldehyde per litre of catalyst per hour. The optimum velocity will vary depending on the reaction temperature and the age and activity of the catalyst, and it is preferred to use the higher values of space velocities in the range set out with the higher temperatures, and vice versa. The reaction is suitably carried out at atmospheric or at moderately increased pressures, but higher or sub-atmospheric pressures may be used if desired.

For the process according to the invention the known methods of vapour phase catalysis may be employed. The catalyst may be a stationary or moving bed, or a fluidised bed method may be used. The process is suitably carried out in a continuous manner.

The activity of the catalyst tends to decline with continued use, owing largely to the deposition of carbon on the catalyst surface, and may be restored in the conventional way, for instance by heating the catalyst in air to burn off the carbon. However, the selectivity of the catalyst for the production of diolefines remains at a high level.

The diolefines can be recovered from the gaseous reaction product in any suitable manner, for instance by condensing the product followed by fractional distillation of the resulting liquid mixture. Unreacted olefines and formaldehyde can be recycled to the catalytic reaction.

A variety of conjugated diolefines can be produced by the process of the invention, including isoprene from isobutene and formaldehyde.

The diolefines made in accordance with this invention are valuable chemical intermediates, for instance in the preparation of synthetic rubbers.

The process of the invention is further illustrated with reference to the following comparative examples.

EXAMPLE 1

A mixture of isobutene, formaldehyde and steam in the molar proportions of 2.6:1:3 was passed at atmospheric pressure over a fuller's earth catalyst at a temperature of 250° C. at a space velocity of 2.8 moles of formaldehyde per litre of catalyst per hour.

The reaction products were condensed and the isoprene content was determined by gas phase chromatography. 35.9 moles of isoprene were formed per 100 moles of formaldehyde consumed.

EXAMPLE 2

Isobutene and vaporised formalin solution were passed at atmospheric pressure over a fuller's earth, marketed as "1:1 Extruded Earth" by the Fullers' Earth Union Ltd., at 300° C. The reaction conditions and results are shown in Table 1. The proportion of formaldehyde in the total feed was less than 10 mole percent.

By way of comparison with the above example, when the fuller's earth catalyst was replaced by activated alumina only very small amounts of isoprene were formed.

Table 1

| Catalyst | Fuller's Earth | Activated Alumina |
|---|---|---|
| Formaldehyde feed rate (moles/hr./litre catalyst) | 2.77 | 12.3 |
| Formalin feed concentration (wt. percent HCHO) | 18.95 | 17.9 |
| Proportion of formaldehyde in total feed (mole percent) | 8.2 | 8.1 |
| Isobutene feed rate (moles/hr./litre catalyst) | 11.35 | 46.9 |
| Formaldehyde consumed (moles/hr./litre catalyst) | 0.85 | 12.05 |
| Isoprene formed (moles/hr./litre catalyst) | 0.65 | 0.5 |
| Yield of isoprene based on formaldehyde consumed (moles percent) | 76.5 | 4.1 |

EXAMPLE 3

A series of processes was carried out in which isobutene and vaporised formalin solution were passed at atmospheric pressure over three different fuller's earths, marketed by the Fullers' Earth Union. Catalyst A was a highly acid activated clay which had been fired at 800° C. Catalyst B was a moderately acid activated clay which had not been fired, while catalyst C was the same clay as catalyst B, but fired at 800° C.

The reaction conditions and results are shown in Table 2.

Table 2

| Run No. | 55 | 56 | 65 | 67 | 68 |
|---|---|---|---|---|---|
| Catalyst | A | A | B | C | C |
| Reaction Temperature, ° C | 300 | 300 | 300 | 300 | 300 |
| Formaldehyde feed rate (moles/hr./litre catalyst) | 3.2 | 1.5 | 2.9 | 3.0 | 2.9 |
| Formalin feed concentration (wt. percent HCHO) | 18 | 18 | 18 | 18 | 18 |
| Proportion of formaldehyde in total feed (mole percent) | 8.0 | 7.7 | 8.0 | 8.7 | 8.0 |
| Isobutene feed rate (moles/hr./litre catalyst) | 13.1 | 6.9 | 12.2 | 9.3 | 12.2 |
| Formaldehyde conversion, percent | 36 | 49 | 80 | 38 | 48 |
| Isoprene formed (grams/hr./litre catalyst) | 53 | 34 | 82 | 47 | 56 |
| Yield of isoprene based on formaldehyde consumed (moles percent) | 68 | 66 | 53 | 62 | 60 |

EXAMPLE 4

A further series of processes was carried out as described in Example 3 using four different fuller's earths marketed by the Fullers' Earth Union Ltd. Catalyst D was an unfired highly acid activated clay with a high degree of residual sulphate activity. Catalyst E was the same clay as catalyst D, except that it had been fired at 800° C. Catalyst F was an unfired clay having a low degree of acid-activation, and catalyst G was the same clay as catalyst F except that it had been fired at 800° C.

The reaction conditions and results are shown in Table 3.

Table 3

| Run No. | 93 | 94 | 81 | 80 | 85 |
|---|---|---|---|---|---|
| Catalyst | D | E | F | G | G |
| Reaction Temperature, ° C | 300 | 300 | 300 | 300 | 300 |
| Formaldehyde feed rate (moles/hr./litre catalyst) | 2.9 | 2.9 | 3.1 | 3.0 | 3.0 |
| Formalin feed concentration (wt. percent HCHO) | 18.7 | 18.7 | 18.7 | 18.7 | 18.7 |
| Proportion of formaldehyde in total feed (mole percent) | 8.3 | 8.6 | 7.7 | 8.3 | 9.6 |
| Isobutene feed rate (moles/hr./litre catalyst) | 11.6 | 10.7 | 15.5 | 12.3 | 7.2 |
| Formaldehyde conversion (percent) | 66 | 36 | 64 | 35 | 28 |
| Isoprene formed (grams/hr./litre catalyst) | 70 | 52 | 89 | 47 | 39 |
| Yield of isoprene based on formaldehyde consumed (moles percent) | 54 | 75 | 67 | 65 | 69 |

EXAMPLE 5

Isobutene and vaporized formalin solution were passed at atmospheric pressure over Cyprus bleaching earth, an acid-activated clay, at a formaldehyde feed rate of 6.16 moles/litre catalyst/hour, and an isobutene feed rate of 25.4 moles/litre/hour. The formalin feed concentration was 17.8% wt./wt., and the proportion of formaldehyde in the total feed was 8.0 mole percent. The reaction temperature was 300° C.

The reaction products were condensed and analysed by a gas phase chromatography. The yield of isoprene based on the formaldehyde consumed was 33 mole percent.

EXAMPLE 6

Isobutene and vaporized formalin solution were passed at atmospheric pressure over Attapulgus 50–248–52, an attapulgite marketed by the Attapulgus Clay Co., Philadelphia, U.S.A., at a formaldehyde feed rate of 6.11 mole/litre/hr., and an isobutene feed rate of 24.3 mole/litre/hr. The formalin feed concentration was 17.8% wt./wt., and the proportion of formaldehyde in the total feed was 8.0 mole percent. The reaction temperature was 300° C.

The reaction products were condensed and analysed by gas phase chromatography. The yield of isoprene based on the formaldehyde consumed was 11 mole percent.

A similar result was obtained when the process was repeated using as catalyst Florex S, a Floridin clay marketed by the Floridin Company, Pennsylvania, U.S.A.

EXAMPLE 7

Isobutene and vaporised formalin solution were passed at atmospheric pressure over Superfiltrol, a montmorillonite clay marketed by The Filtrol Corporation, California, U.S.A., at a formaldehyde feed rate of 6.05 mole/litre/hr., and an isobutene feed rate of 23.8 mole/litre/hr. The formalin feed concentration was 17.8% wt./wt., and the proportion of aldehyde in the total feed was 8.1 mole percent. The reaction temperature was 300° C.

The reaction products were condensed and analysed by gas phase chromatography. The yield of isoprene based on the formaldehyde consumed was 29 mole percent.

EXAMPLE 8

A mixture of isobutene and vaporised formalin solution were passed at atmospheric pressure over acid activated Quattara Bentonite Clay, an illite clay supplied by Cairo Sand Brick Company, Cairo, Egypt, at a formaldehyde feed rate of 6.11 mole/litre/hr., and an isobutene feed rate of 24.6 mole/litre/hr. The formalin feed concentration was 17.8% wt./wt. and the proportion of formaldehyde in the total feed was 8.0 mole percent. The reaction temperature was 300° C.

The reaction products were condensed and analysed by gas phase chromatography. The yield of isoprene based on the formaldehyde consumed was 33 mole percent.

I claim:

1. The process for the production of isoprene which comprises reacting isobutene with formaldehyde at an elevated temperature in the range of 150° to 400° C. in the vapor phase in the presence of a catalyst consisting essentially of fuller's earth.

2. The process as claimed in claim 1 wherein the proportion of formaldehyde in the total feed is between 2 and 10 mole percent.

3. The process as claimed in claim 1 wherein the reaction is carried out in the presence of an inert diluent.

4. The process as claimed in claim 3 wherein the inert diluent is steam.

5. The process as claimed in claim 1 wherein the reaction is carried out at a temperature between 250° and 350° C.

6. The process as claimed in claim 1 wherein the space velocity of the reactants over the catalyst is between 0.5 and 50 moles of formaldehyde per litre of catalyst per hour.

7. The process as claimed in claim 1 wherein the catalyst is in the form of a fluidised bed.

References Cited in the file of this patent

UNITED STATES PATENTS

| | | |
|---|---|---|
| 2,350,485 | Arundale et al. | June 6, 1944 |
| 2,368,494 | Rosen et al. | Jan. 30, 1945 |
| 2,376,986 | Shoemaker | May 29, 1945 |
| 2,377,025 | Miller | May 29, 1945 |
| 2,389,205 | Marsh | Nov. 20, 1945 |
| 2,412,762 | Workman | Dec. 17, 1946 |
| 2,421,554 | Finch et al. | June 3, 1947 |
| 2,502,432 | Copenhaver et al. | Apr. 4, 1950 |